Sept. 21, 1937.　　　F. L. CREAGER　　　2,093,420
GEAR
Filed Nov. 9, 1934
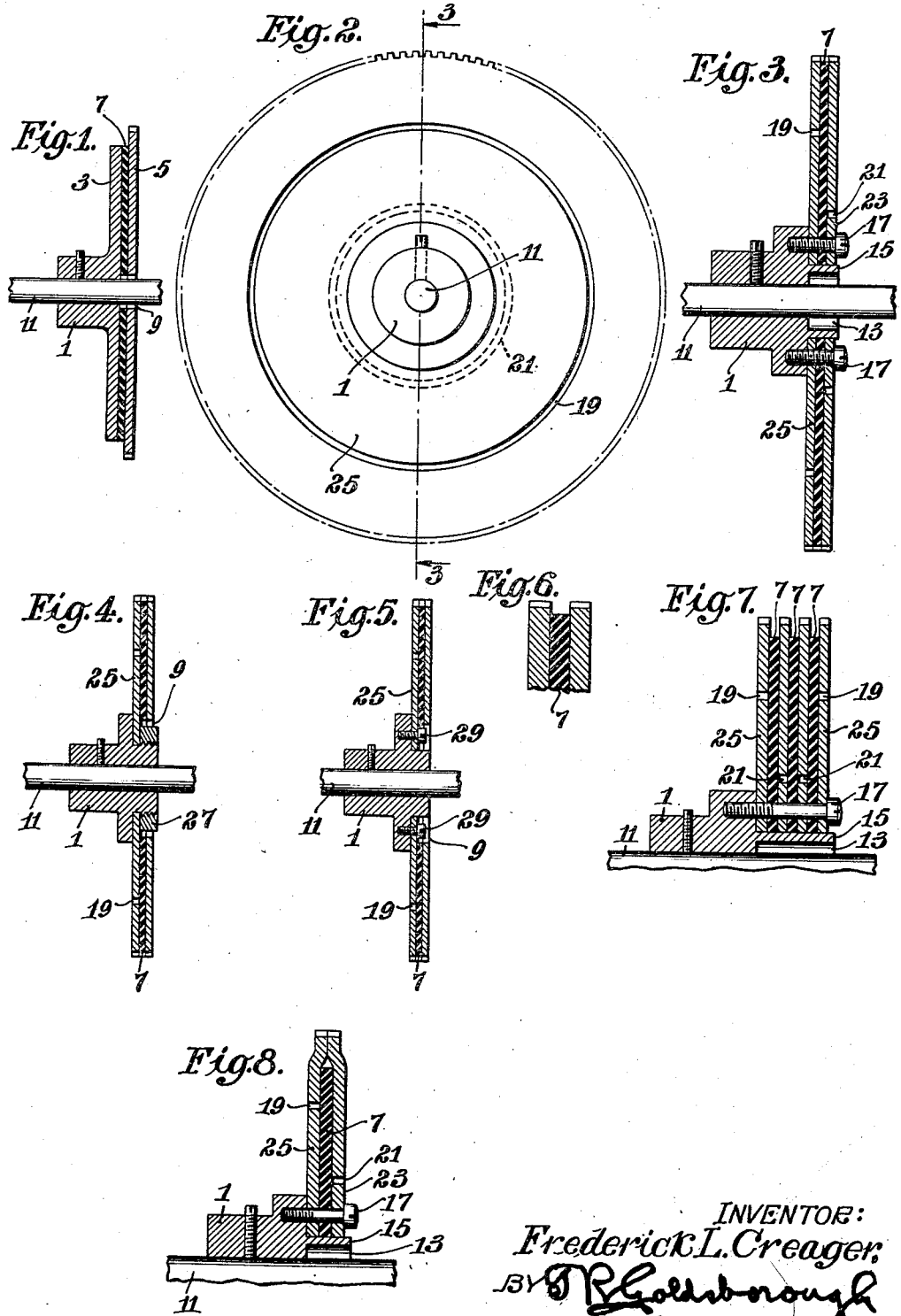
INVENTOR:
Frederick L. Creager,
BY R Goldsborough
ATTORNEY.

Patented Sept. 21, 1937

2,093,420

UNITED STATES PATENT OFFICE 2,093,420

GEAR

Frederick L. Creager, Camden, N. J., assignor, by mesne assignments, to Radio Corporation of America, New York, N. Y., a corporation of Delaware Application November 9, 1934, Serial No. 752,227

15 Claims. (Cl. 64—27)

My invention relates to gears and it has particular relation to gears adapted for use in positions where noise must be substantially eliminated and the transmission of vibrations, from the hub to the teeth and vice versa, must be prevented.

Heretofore, efforts have been made to manufacture noiseless gears by utilizing non-resonant materials such as bakelite-impregnated canvas or linen and the like. Such gears, however, do not provide sufficient internal damping to absorb vibrations and even the best of them are more or less noisy.

It is, accordingly, an object of my invention to provide an improved noiseless gear that can be fabricated from laminated materials commercially available at relatively low cost.

Another object of my invention is to provide, in a gear of the type described, means constituting what might well be termed a "low-pass" filter which, in operation, adequately transmits torque between the teeth and the hub but which damps out noise vibrations and vibrations imparted thereto from associated gear-trains or prime-movers.

Another object of my invention is to provide, in a gear of the type described, means for silencing the ringing noise which is very noticeable during the operation of gears of previously known types.

Another object of my invention is to provide a noiseless and non-resonant gear that shall be stronger and more durable than devices heretofore on the market.

A still further object of my invention is to provide a gear that shall be simple and durable in construction, inexpensive to manufacture and which will be very efficient in operation.

An additional and still more specific object of my invention is to provide a gear wherein a material having high internal damping, or iterative impedance, but relatively low resistance to shear, may be utilized for silencing and torque-transmitting purposes.

Gears available previous to my invention have been made wholly of resinoid-impregnated fabrics, in order to attain a measure of silence, and they have also included fiber inserts and the like for the same purpose. The last mentioned type is exemplified by the Christenson Patent 1,427,-721 wherein is shown an annular torque-transmitting ring interposed bodily between the hub and the teeth, which ring is subjected to shear along an infinite number of cylindrical surfaces when the device is in operation. In the event that the fiber is highly resistant to shear, a gear of the Christenson type stands up well in use. Obviously, the reduction of noise is in inverse ratio to the stiffness of the fiber since the internal damping therein is a function of the mobility of the molecules and the friction therebetween when the ring is subjected to shearing forces representative of noise-vibrations and the like.

If a ring of "Viscoloid", "Art gum", "Glyptal", soft rubber or oil-impregnated felt could be utilized in a gear of the Christenson type a high degree of noise-reduction would be obtained. Such materials do not sufficiently resist shear; their use, therefore, despite their desired characteristics, is precluded. The trade name "Viscoloid" as herein used will be understood to refer to a soft pyroxylin sheet containing a large percentage of plasticizing substances compounded to give a high energy loss, due to internal viscous friction, when deformed. "Art Gum" is a compound usually employed for erasing and cleaning purposes, made from vegetable oils by vulcanization and polymerization with sulphur or sulphur chloride. "Glyptal" is a trade name for synthetic resins of the alkyd type and products containing such resins. Such material contains a large percentage of plasticizing substances, compounded to give a high energy loss when deformed, due to internal viscous friction.

In accordance with my invention I depart radically from gears of the type just discussed and I utilize a relatively thin layer of damping material, substantially coextensive in diameter with the gear, for transmitting torque between the hub and the teeth thereof. The layer may be constituted by any of the materials above mentioned with the possible exception of oil-impregnated felt and, since the shearing forces are distributed over a much greater area than heretofore customary, my improved gear is substantially as rigid, radially, as gears of the prior art. At the same time, noise is very materially reduced by the high internal damping of the layer.

The action of my improved gear can be very simply demonstrated by holding tightly a thin sheet of rubber between the palms of the hands and then endeavoring to turn one hand with respect to the other. If this is done, it will be noted that the rubber sheet, even though it be extremely thin, has sufficient area to resist shear and to transmit a large amount of torque. This experiment exemplifies the very important basic feature of my invention and it should be kept in mind when considering the numerous modifications of which the invention is capable.

The novel features that I consider characteristic of my invention are set forth in the appended claims. The invention itself, however, both as to its organization and its method of operation together with additional objects and advantages thereof, will best be understood from the following description of several embodiments when read in connection with the accompanying drawing in which:

Figure 1 is a cross-sectional view of a gear exemplifying my invention in its simplest form, Fig. 2 is a view in elevation of a modified commercial form, Fig. 3 is a sectional view taken along a line corresponding to the line 3—3 in Fig. 2, and Figs. 4, 5, 6, 7 and 8 exemplify additional modifications.

In all figures, equivalent elements are similarly designated.

Reduced to its simplest form, as exemplified by Fig. 1, my improved gear may be constituted by a hub 1 to which is affixed a face plate 3, a disc of steel or other material 5, such as bakelite-impregnated fabric or the like, provided with peripheral teeth, and an interposed layer 7 of printers' roll, Glyptal, rubber, Viscoloid, Art Gum or the like. The tooth-carrying disc 5 has an axial opening 9 sufficiently large to clear a shaft 11 to which the hub may be affixed. Obviously, the shaft may terminate in the plane of the face-plate, in which case the disc 5 and the layer 7 may be devoid of the opening 9. At the present time, I prefer to interpose rubber between the face plate and the disc since it may be firmly vulcanized to both members.

Viscoloid or Glyptal is really preferable to rubber, for the layer 7, because of their high internal damping but it is somewhat difficult to make them adhere sufficiently firmly to the face plate and the disc to transmit an adequate amount of torque between the hub and the teeth.

As hereinbefore explained, the bonding material 7 has two functions, namely the transmission of torque and the prevention of vibration-transfer between the teeth and the shaft. The torque is transmitted without deformation of the material because of the relatively large area thereof which is subjected to shear. The damping of vibratory forces is accomplished because of the high internal viscosity of the material which converts spurious vibrations into heat and, by reason of its high iterative impedance, it prevents vibratory forces appearing either in the shaft or at the teeth from being reflected back thereto. The net result is that the gear is extremely silent in operation; in fact, much more so than other gears with which I am familiar.

Although my invention is exemplified by Fig. 1 of the drawing, I prefer to practice it through the utilization of laminated material which is now commercially available, which material is constituted by two outer layers of steel or bakelite-impregnated fabric bonded to an intermediate layer of rubber by vulcanization.

Referring now to Figs. 2 and 3 of the drawing, a circular gear is first fabricated in a conventional manner from the laminated material and is provided with a central opening 13 large enough to accommodate a cylindrical shoulder 15 extending from the face of the hub member 1 and being coaxial with the opening therethrough. The hub member is preferably affixed to the gear by means of a plurality of studs 17 which extend through all three of the laminations into properly threaded openings in the face of the hub. A circular channel 19 is cut through one of the outer layers and a similar circular channel 21 is cut entirely through the other outer layer, the two channels having differing radii. These channels effectively isolate the periphery of the gear from the hub insofar as the rigid outer layers are concerned. Torque, therefore, is applied from the hub to the teeth only by way of the central layer 7 in substantially identically the same way as was described in connection with Fig. 1. That is to say, by reason of the difference in the radii of the several channels, there is a ring-shape area of the central layer defined by the channels which is subjected to shear during use of the gear and which, although it transmits torque as explained, serves to damp out spurious vibrations.

It also lies within the scope of my invention to omit the central smaller ring 23 of rigid material farthest the hub and to transmit torque to the teeth solely through the larger ring 25 of metal, bakelized fabric or the like adjacent the hub, as clearly indicated in Figs. 4 and 5.

In Fig. 4 it will be noted that the larger ring 25 may be clamped to the hub by a lock-nut 27 and, in Fig. 5 by a plurality of studs 29. It will also be noted in both of these figures that the axial opening 9 in the lamination farthest from the hub and in the central material 7 is large enough to clear the lock-nut or the said studs.

In some instances, as exemplified in Fig. 6 of the drawing, it may be desirable to remove some of the interposed material 7 from between the teeth adjacent the periphery of the gear. This may be done by burning away the material with a hot wire or by turning or grinding.

Referring once more to Figs. 4 and 5, if the layer of material adjacent the hub and in contact therewith is metal, it obviously lies within the scope of my invention to utilize welding instead of the lock-nut or the studs.

Under certain circumstances, it may be desirable to provide a gear having a much wider face than those shown in the figures just discussed. This may be accomplished by substantially duplicating the construction shown in Fig. 3. In other words, if one of the gears shown in Fig. 3, removed from the hub, is bonded to a similar gear by means of an interposed layer of rubber or the like, a construction such as shown in Fig. 7 will result. It is also feasible to manufacture a gear of this type by threading a plurality of circular discs and rings of the proper material upon a mandrel in the order shown in the drawing and then subjecting the assembly to heat and pressure. If this method of manufacture is adopted, it is preferable that the bakelite-impregnated discs and rings be only partially polymerized before the molding operation and that the rubber layers be unvulcanized. When such semi-finished materials are utilized vulcanization, bonding and complete polymerization are accomplished in a single step.

In Fig. 7 the layers of damping material are shown as falling short of the periphery of the gear. This illustration is merely for the purpose of making the drawing more easily understandable and it is to be understood that in the finished gear the bonding material may extend into registry with the teeth, if desired.

It is also to be clearly understood that the tooth-carrying portions of the gear illustrated in Fig. 7 may be of metal in order to provide greater durability without in any way detracting from the usefulness of the device.

In certain situations it may be highly desirable to render the periphery of the gear substantially immune to oil or water. One way of accomplishing this, as exemplified by Fig. 8 of the drawing, is to cut away a substantial portion of the central layer 7 adjacent the teeth and, through a molding operation, to soften the tooth carrying portions of the outer discs and to press them into contact each with the other. This may easily be done if the material from which the gear blanks are cut is only partially polymerized. It may also be done if the outer laminations are metal, in which case, after bending the peripheries into contact they may be sweated, brazed or welded together.

From a consideration of the foregoing description of various gears manufactured according to my invention, it will be clear that they have many desirable characteristics not heretofore obtainable in such large measure. On account of the large area of material through which torque is transmitted such material may be much more friable than customary materials utilized for similar purposes and it may be much less resistant to deformation. At the same time, since my invention permits the use of material having high internal viscosity, the gear assembly is analogous to a low-pass filter which transmits torque yet, at the same time, by-passes or consumes as heat the energy of spurious vibrations such as may be occasioned by the engagement of gear teeth or which may be inherent in the train of mechanism which applies force to the driveshaft.

Many other advantages of my improved gear will be apparent to those skilled in the art, as will also numerous alternative forms. My invention, therefore, is not to be restricted to the specific embodiments chosen for illustrative purposes but is to be limited only by the prior art and by the spirit of the appended claims.

I claim as my invention:

1. As an article of manufacture a machine element constituted, in the order given, by a disc capable of transmitting torque, a layer of material having high internal damping bonded to the disc, and a disc or ring of substantially rigid material bonded in torque transfer relation to the damping material, the sole torque transfer connection between said first mentioned disc and said second mentioned disc or ring being constituted by said layer of material.

2. The invention set forth in claim 1 wherein the damping material is soft rubber.

3. As an article of manufacture a machine element constituted by at least three laminae bonded in torque transfer relation, the outer two laminae being of substantially rigid material and the central lamina being of material having high internal damping, the sole torque transfer connection between said two outer laminae being constituted by said central lamina.

4. As an article of manufacture, a machine element constituted by at least three laminae bonded in torque transfer relation, the outer two laminae being of substantially rigid material and the central lamina being of material having high internal damping, said outer laminae being provided with a circular channel concentric with the axis of the machine element for the purpose of insulating the periphery from the central portion thereof, one channel being cut on a radius larger than the radius of the other channel.

5. In a gear, a circular torque transmitting ring, a sheet of material having high internal viscosity carried by the ring, a second ring lying in the plane of the first ring and surrounding it, the said ring being also affixed to the said sheet of material, and a third ring carried by the opposite side of the sheet of material and also affixed thereto, the said second and third rings being coaxial and the peripheries thereof being in juxtaposition.

6. The invention set forth in claim 5 characterized in that the central opening through the third ring is of lesser diameter than the diameter of the first ring.

7. The invention set forth in claim 5 characterized in that the opening in the third ring is of lesser diameter than the diameter of the first ring and additionally characterized in that another ring is disposed within the said opening and is affixed to the said sheet of material.

8. As an article of manufacture, a gear constituted by a circular ring or disc provided with peripheral teeth, a hub carrying a face plate, the periphery of which is in juxtaposition to the periphery of the ring, and an intermediate sheet of material having high internal viscosity bonded to and in torque transfer relation with both the plate and the ring or disc, the sole torque transfer connection between said hub and the peripheral teeth on said ring or disc being constituted by said intermediate sheet of material.

9. As an article of manufacture, a laminated gear constituted by a plurality of discs and a plurality of interpolated sheets of damping material, the peripheries of the discs being separated from the central portions thereof by circular channels extending entirely therethrough, the said channels being so disposed with respect to each other and to the interpolated sheets of material that the hub portion of the gear is so effectively insulated from the peripheral portion as to prevent the transmission of spurious vibrations applied to said hub from an external source.

10. As an article of manufacture, a laminated gear comprising an intermediate lamination and laminations disposed on each side of and bonded to the latter, a hub to which said laminations are secured, each of said last-named laminations being discontinuous in the radial direction from the outer edge thereof to the axis of the gear and at different distances radially from said axis.

11. As an article of manufacture, a laminated gear comprising an intermediate lamination of material having high internal viscosity and laminations disposed on each side of and bonded to the latter, a hub to which said laminations are secured, said gear being provided with a channel through one of said last-named laminations and extending around the axis of the gear, the other of said last-named laminations being discontinuous in the radial directions from the outer edge thereof to said axis and at a different distance radially from said axis than said groove.

12. As an article of manufacture, a laminated gear comprising three laminations bonded one to another, a hub to which said laminations are secured, said gear being provided with grooves through the outer laminations and extending around the axis of the gear, said grooves being disposed at different distances radially from said axis.

13. As an article of manufacture, a laminated gear comprising an intermediate lamination and laminations disposed on each side of the latter, a hub to which said laminations are secured, said laminations radially outwardly from said hub being secured together solely by adhesion between their respective adjacent surfaces in planes perpendicular to the axis of the gear, said gear being provided with a groove through one of said last-named laminations and extending around said axis, the other of said last-named laminations being discontinuous in the radial direction from the outer edge thereof to said axis and at a different distance radially from said axis than said groove.

14. As an article of manufacture, a laminated gear comprising an intermediate lamination and laminations disposed on each side of the latter, the intermediate lamination being of relatively pliable and shock-absorptive material as compared with the material of said last-named laminations, a hub to which said laminations are secured, said laminations radially outwardly from said hub being secured together solely by adhesion between their respective adjacent surfaces in planes perpendicular to the axis of the gear, said gear being provided with a groove through each of the laminations adjacent the intermediate lamination and substantially concentric about the center of the gear, said grooves being disposed respectively on different radii from the center of the gear.

15. As an article of manufacture, a hub, sets of annular discs secured to said hub, and a disc of relatively pliable and shock-absorptive material, as compared with the material of said first-named discs, disposed between said sets, the discs of each of said sets being disposed one within the other and spaced from each other at their respective adjacent edges, the outside diameter of the inner disc of one of said sets being greater than the outside diameter of the inner disc of the other of said sets, said disc being vulcanized together over their respective adjacent faces, the outer discs of each of said sets being provided in their outer edges with gear teeth.

FREDERICK L. CREAGER.